(12) United States Patent
Chazin

(10) Patent No.: US 7,689,699 B2
(45) Date of Patent: Mar. 30, 2010

(54) METHOD AND APPARATUS FOR EXECUTING WEB SERVICES THROUGH A HIGH ASSURANCE GUARD

(75) Inventor: David Chazin, Denver, CO (US)

(73) Assignee: The Boeing Company, Chicago, IL (US)

( * ) Notice: Subject to any disclaimer, the term of this patent is extended or adjusted under 35 U.S.C. 154(b) by 299 days.

(21) Appl. No.: 11/810,914

(22) Filed: Jun. 7, 2007

(65) Prior Publication Data

US 2008/0307101 A1 Dec. 11, 2008

(51) Int. Cl.
*G06F 15/16* (2006.01)
(52) U.S. Cl. ...................................... 709/229
(58) Field of Classification Search ................ 709/229, 709/223
See application file for complete search history.

(56) References Cited

U.S. PATENT DOCUMENTS

| | | | | |
|---|---|---|---|---|
| 2001/0034757 | A1* | 10/2001 | Crockett | 709/203 |
| 2007/0204145 | A1* | 8/2007 | Bunn et al. | 713/152 |
| 2007/0204337 | A1* | 8/2007 | Schnackenberg et al. | 726/11 |
| 2007/0282951 | A1* | 12/2007 | Selimis et al. | 709/205 |
| 2008/0052399 | A1* | 2/2008 | Nguyen | 709/227 |

* cited by examiner

*Primary Examiner*—Wing F Chan
*Assistant Examiner*—Tesfay Yohannes
(74) *Attorney, Agent, or Firm*—Gates & Cooper LLP

(57) ABSTRACT

In accordance with an embodiment, a method of executing web services through a high assurance guard includes transmitting a target service request having routing information from the source security domain to a source one-way high assurance guard (HAG) service, inspecting the target service request in the source one-way HAG service to determine if the target service request violates at least one rule governing communications transmitted from the first security domain, transmitting the target service request to a destination one-way HAG service in the destination security domain via a one-way HAG according to the routing information if the target service request does not violate the at least one rule and discarding the second target service request if the target service request violates the at least one rule, and providing the target service request to the target service.

20 Claims, 3 Drawing Sheets

METHOD AND APPARATUS FOR EXECUTING WEB SERVICES THROUGH A HIGH ASSURANCE GUARD

CROSS-REFERENCE TO RELATED APPLICATIONS

This application is related to U.S. patent application Ser. No. 11/809,262, entitled "METHOD AND APPARATUS FOR RELIABLE, HIGH SPEED DATA TRANSFERS IN A HIGH ASSURANCE MULTIPLE LEVEL SECURE ENVIRONMENT," by Steven L Arnold and Thomas B. Donofino, filed May 31, 2007, which application is hereby incorporated by reference.

BACKGROUND

1. Technical Field

The present disclosure relates to systems and methods for the transmission and reception of data and in particular to a system and method for executing web services through a high assurance guard.

2. Description of the Related Art

The dissemination and processing of data is one of the key characteristics of the information age. Data can be categorized in a number of different ways, but one of the important data classifications involves how widely the data is permitted to be disseminated. For example, it has long been the case in military-related matters that data be unclassified (for general dissemination), confidential (not generally disseminated, but no harm to national security if disseminated), secret (dissemination would harm national security), and top secret (dissemination would do grave harm to national security).

Building integrated systems composed of subsystems or components operating at different classification levels in a Multiple Level Security (MLS) or Multiple Independent Level of Security (MILS) environment may require passing information through High Assurance Guards (HAGs) in order to maintain information security. HAGs permit one-way communication channels only, in order to prevent leakage, probing, and inadvertent passing of classified information. This constraint is incompatible with common networking protocols (such as transfer control protocol/internet protocol or TCP/IP) and higher level constructs built on this construct (such as Web Services) that depend on two-way communication to verify message receipt.

It may be beneficial for service oriented architectures (SOAs) to be implemented across MLS and MILS environments. In SOAs, Web Services exist on the network that perform data processing operations and exchange data. To accomplish this, however, a method and apparatus that allows such services to be invoked synchronously (wherein the requestor is blocked from further actions until a response is received) and asynchronously (wherein the requestor sends a request and does not expect a return or wherein the requestor is not blocked from further actions until a response is received) across security domains according to the rules enforced by HAGs is needed. The present invention satisfies this need.

SUMMARY

To address the requirements described above, this document discloses a method and apparatus for invoking web services in different security domains through two high assurance guards, one of which has a rule set that allows passing data from a higher to a lower classification, and the other that allows passing data from a lower to a higher classification.

In one embodiment, this document discloses a method of transmitting information from a source security domain associated with a first security classification to one of a plurality of destination security domains associated with a second security classification. The method comprises the steps of transmitting a target service request having routing information from the source security domain to a source one-way high assurance guard service, inspecting the target service request in the source one-way HAG service to determine if the target service request violates at least one rule governing communications transmitted from the first security domain, transmitting the target service request to a destination one-way HAG service in the destination security domain via a one-way HAG according to the routing information if the target service request does not violate the at least one rule and discarding the second target service request if the target service request violates the at least one rule, and providing the target service request to the target service.

This document also discloses an embodiment in which an apparatus for transmitting a target service request to a target service is described. The apparatus comprises a source security domain associated with a first security classification wherein the source security domain including source one-way high assurance guard (HAG) service, a destination security domain associated with a second security classification wherein the destination security domain including a destination one-way HAG service, and a one-way HAG communicatively coupling the source security domain and the destination security domain via the source one-way HAG and the destination one-way HAG. In this embodiment, the source one-way HAG service accepts a target service request, inspects the target service request to determine if the target service request violates at least one rule governing communications transmitted from the source security domain, and transmits the target service request to the destination one-way HAG service via the one-way HAG only if the target service request does not violate the at least one rule and discards the target service request if the target service request violates the at least one rule. Further, the destination one-way HAG service provides the target service request to the target service.

This document also discloses an embodiment practiced by a method of transmitting information between a source security domain associated with a first security classification to one of a plurality of destination security domains associated with a second security classification. The method comprises the steps of transmitting a target service request from a client to a source two-way high assurance guard (HAG) service, generating a unique token from the target service request, the token associating the target service request with the client, transmitting the target service request and the token to a destination two-way HAG service via a first source one-way HAG service, a HAG and a first destination one-way HAG service, executing the target service request to produce response data, transmitting the response data and the token from the destination two-way HAG service to the source two-way HAG service via a second destination one-way HAG service, a second HAG, and a second source one-way HAG service, and delivering the response data to the client. This embodiment is also realized by an apparatus for transmitting a target service request to a target service and receiving a response therefrom, comprising a source security domain associated with a first security classification, the source security domain including a source two-way high assurance guard (HAG) service communicating with a first source one-way HAG service and a second source one-way HAG service, a destination security domain associated with a second security classification, the destination security domain comprising a destination two-way HAG service communicating with a first destination one-way HAG service and a second destination one-way HAG service, and a first HAG, communicatively coupling the first source one-way HAG service and the first destination one-way HAG service, a second HAG, communicatively coupling the second destination one-way HAG service and the second source one-way HAG service. In this embodiment, the source two-way HAG service accepts the target service request from a client, generates a unique token from the target service request, the token associating the target service request with the client, and transmits the target service request and the token to the destination two-way HAG service via the first source one-way HAG service, the HAG and the first destination one-way HAG. The target service executes the target service request to produce response data, and the destination two-way HAG service receives the response data and transmits the response data and the token from the destination two-way HAG service to the source two-way HAG service via the second destination one-way HAG, the second HAG and the second source one-way HAG service to deliver the response data to the client.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Figure 1:
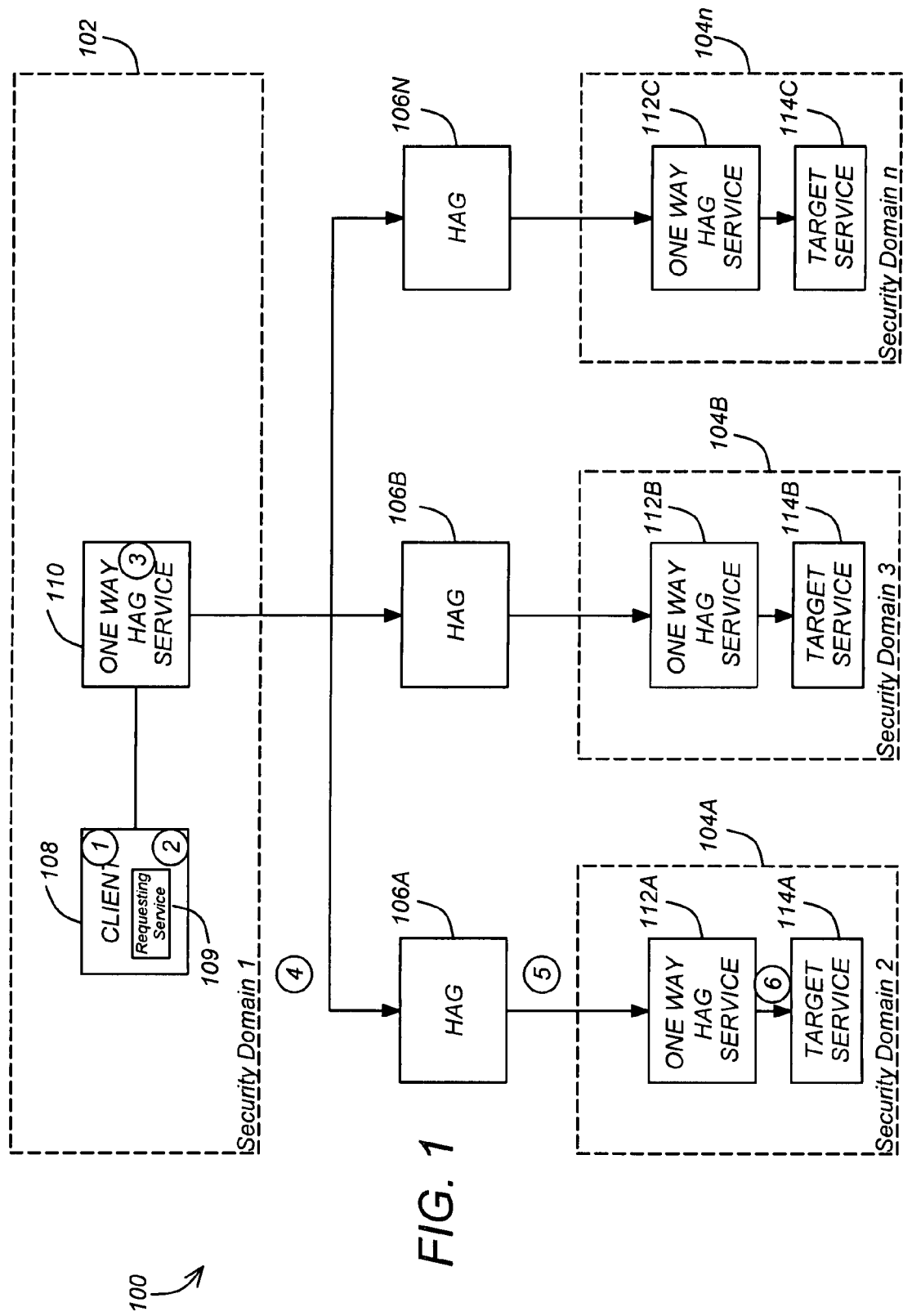
FIG. 1 is a block diagram showing an exemplary first embodiment describing one-way delivery and execution of requests from one domain to another.

FIG. 1 is a diagram illustrating a first embodiment of this disclosure. In this embodiment a source security domain 102 is communicatively coupled with one or more destination security domains 104A-104N (hereinafter alternatively referred to as destination security domain(s)) 104 via associated HAGs 106A-106N (hereinafter alternatively referred to as HAG(s) 106).

The source security domain 102 includes a client 108 implementing a requesting service 109 (alternately referred to as a requesting client) and a source one-way HAG service 110. The destination security domain 104 includes destination one-way HAG service 112 and the target service 114. The source security domain 102 is associated with a first security classification, while the destination security domain 104 is associated with a second security classification different than the first security classification. For example, the first security classification may be "unclassified" and the second security classification a higher security domain such as "secret".

The source one-way HAG service 110 accepts the target service request, inspects the target service request to determine if the target service request violates at least one rule governing communications transmitted from the source security domain, and transmits the target service request to the destination one-way HAG service 112 via the one-way HAG 106 only if the target service request does not violate the at least one rule and discards the second target service request if the target service request violates the at least one rule.

In one embodiment, the requesting service 108 and target service 114 are Web services that can be used to permit one-way delivery and execution of requests from the source security domain 102 to the destination security domain 104. A request originating by a requesting service 109 in the source security domain 102 can therefore be executed in the destination security domain 104 (which may be at a higher security classification) through a HAG 106 using one-way HAG services 110, 112 in each domain 102, 104. The one-way HAG services 110, 112 make use of content based routing to intelligently route the message to the proper high assurance guard on the originating side and to the proper service on delivery side to pass the request to the desired target service (e.g. one of the target services 114A-114N). This content based routing can be provided by the infrastructure hosting the Web Service such as an Enterprise Service Bus (ESB) or by the Web service itself.

Figure 2:
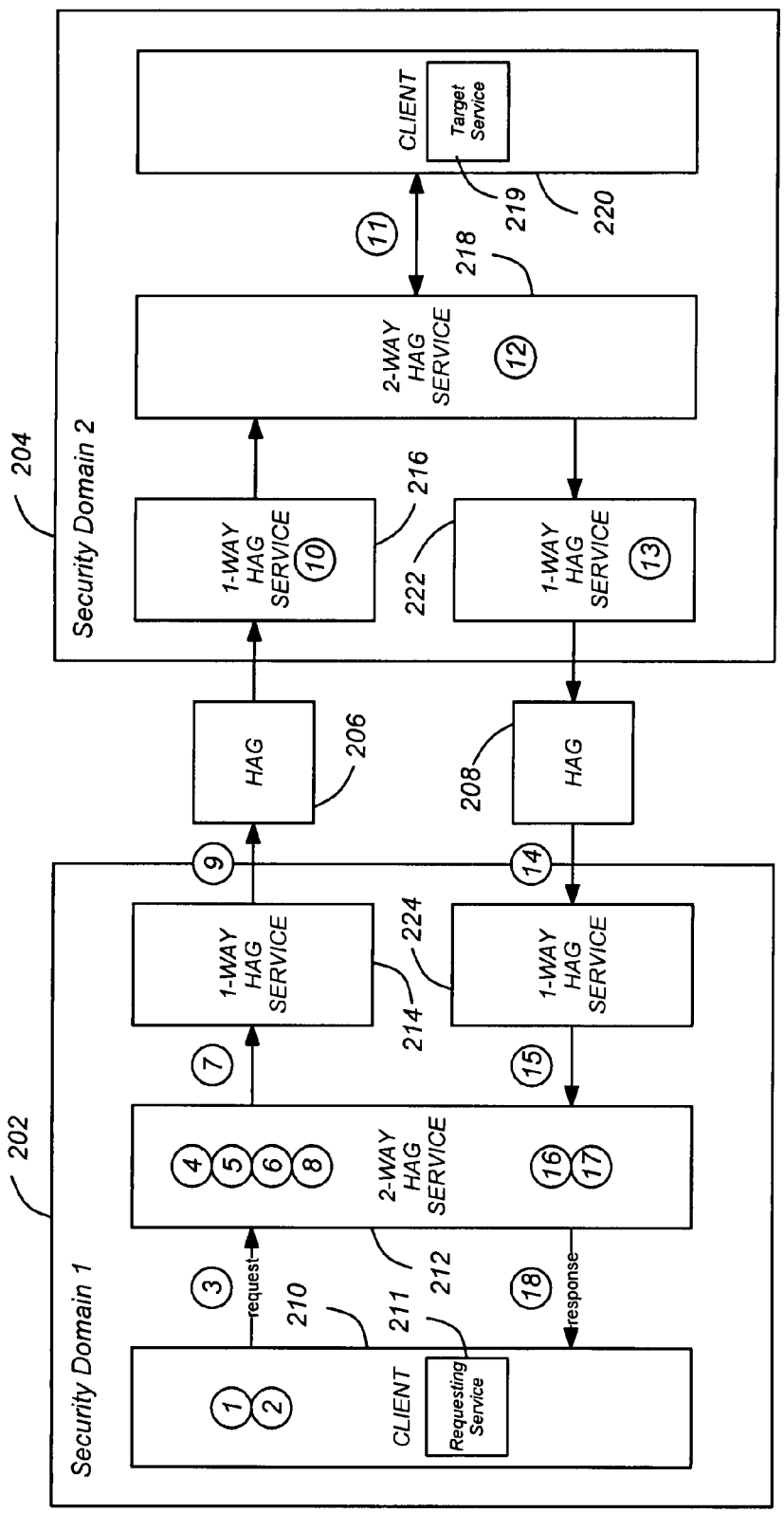
FIG. 2 is a block diagram showing an exemplary second embodiment describing synchronous delivery and execution of requests from one domain to another, and delivery of the response generated from those requests to the requester.

Further detail regarding the embodiment shown in FIG. 1 is presented below by step by step description. These "steps" are illustrated in FIGS. 1 and 2 by a circle with the step number inside the circle. For example, step 1 is indicated by [1].

Referring again to FIG. 1, first, a target service request having routing information is transmitted from the source security domain 102 to the source one-way HAG service 110. This can be accomplished by the requesting client 108 generating and formatting a service request to be transmitted to the target service 114A as shown in step 1, wrapping the formatted target service request in a request to the one-way HAG service 110 as shown in step 2, and invoking the source one-way HAG service 110.

Next, the source one-way HAG service 110 unwraps the wrapped request, and inspects the target service request determine if the target service request violates at least one rule governing communications transmitted from the first security domain, and to read.

If the request violates any of the rules governing communications from the source security domain 102, the request is discarded and the process of transmitting the service request to the destination is terminated without notifying the requesting client 108. If the request does not violate any of the rules governing communications from the source security domain, the request is routed the destination one-way HAG service in the destination security domain 104A associated with the target service request via the appropriate HAG 106A. This is referred to as content-based routing, and is shown in step 4. The routing information can be included in the target service request or can be inferred from the target service.

Next, the target service request is transmitted to the destination one-way HAG service 112A in the destination security domain 104A via the HAG 106A according to the routing information. This is illustrated in step 5. Finally, the target service request is provided to the target service. This can be accomplished, for example, by the destination one-way HAG service 112A inspecting the payload and executing the request on the target service 114A.

In step 5, the target service is delivered through the associated HAG 106A to the one-way HAG service 112A in the destination security domain 104A. The one-way HAG service 112A inspects the payload provides the target service request to the target service 114A, where it is executed.

FIG. 2 is a diagram illustrating a second disclosed embodiment. In this embodiment, a source security domain 202 is communicatively coupled to a destination security domain 202 by a first HAG 206 and a second HAG 208.

The source security domain 202 is associated with a first security classification and includes a source two-way HAG service 212 communicating with a first source one-way HAG service 214 and a second source one-way HAG service 224.

The destination security domain 204 is associated with a second security classification which is different than the first security classification, and comprises a destination two-way HAG service 218 communicating with a first destination one-way HAG service 216 and a second destination one-way HAG service 222.

The source two-way HAG service 212 accepts the target service request from the requesting service 209 implemented on the client 210, and generates a unique token from the target service request. The unique token associates the target service request with the client 210 or the requesting service 209. The source two-way HAG service 212 then transmits the target service request and the token to the destination two-way HAG service 218 via the first source one-way HAG service 214, the first HAG 206 and the first destination one-way HAG 216.

The target service 209 implemented in the destination client 220 then executes the target service request to produce response data. The destination two-way HAG service 218 receives the response data and transmits the response data and the token from the destination two-way HAG service 218 to the source two-way HAG service 212 via the second destination one-way HAG 222, the HAG 206 or optional second HAG 208 shown in FIG. 2, and the second source one-way HAG service 224 to deliver the response data to the requesting service 209 of the client 210.

In one embodiment, the target service request is generated in a thread executing in the source security domain 202, and the thread is suspended after transmitting the target service request and the token to the destination two-way HAG service 218 and resumed upon receipt of the response data in the source two-way HAG service 212 using the token.

Further detail regarding the embodiment shown in FIG. 2 is described below. A target service request is transmitted from a requesting service 211 implemented in a client 210 to a source two-way HAG service 212. In one embodiment, this is accomplished by the client 210 formatting a request to the target service 219, as shown in step 1, wrapping the target service request in a request to the source two-way HAG service 212, as shown in step 2, instructing the client 210 to invoke the source two-way HAG service 212, as shown in step 3. The source two-way HAG service 212 then inspects the request, extracts the target service request, and transmitted to the domain the request needs to be routed to for execution, as shown in step 4. Next, the source two-way HAG service generates a unique token from the target service request, as shown in step 5. The token associates the target service request with calling process (e.g. the client 210 or the requesting service 211).

The target service request and the token is then transmitted to a destination two-way HAG service 218 via a first source one-way HAG service 214, a HAG 206, and a first destination one-way HAG service 216.

In one embodiment, this is accomplished by creating a source one-way HAG 14 request that routes a payload having the target service request and the token to the destination security domain 204, as shown in step 6, invoking the one-way HAG service, as shown in step 7, optionally suspending the current thread, as shown in step 8, and delivering the target service request though the HAG 206 to the destination one-way HAG service 216 in the second security domain 204, as shown in step 9. The destination one-way HAG service 216 inspects the payload and routes it to the destination two-way HAG service 218, as shown in step 10. The destination two-way HAG service 218 executes the target service request on the target service 219 to produce response data, as shown in step 11.

A second payload having the response data and the token is then transmitted from the destination two-way HAG service 218 to the source two-way HAG service 212 via a second destination one-way HAG service 222, a second HAG 20, and a second source one-way HAG 224.

In one embodiment, this is accomplished by the destination two-way HAG service 218 receiving the response data returned from the target service 219 and wrapping that response data and the token in a request to the source two-way HAG service 212, as shown in step 12, invoking the destination one-way HAG service 222 to deliver the response back to the source security domain 202 as shown in step 13, delivering the request through the second HAG 208 and to the second source one-way HAG service 224 as shown in step 14, inspecting the second payload in the second source one-way HAG service 224 and routing it to the source two-way HAG service 212.

Finally, the response data is delivered to the requesting service 211 in the client 210. This can be accomplished by the source two-way HAG service 212 extracting the unique token and the response data as shown in step 16, and using the unique token, resuming the suspended thread, as shown in step 17. Finally, the resumed thread sends the response data to the requesting service 211 in the client 210, as shown in step 18.

The system and method shown in FIG. 2 illustrates the use of another pair of services 211, 219 to provide synchronous request/response execution of requests from a first security domain 202 to a second security domain 204 through two or more HAGs 206, 208. The synchronous behavior is achieved by wrapping the original target service request and passing a unique token back and forth through the HAGs 206, 208. The one-way HAG services 214, 216, 222, 224 are used as transport mechanisms for the target service request and for the response data, through separate invocations in the source-to-destination and destination-to-source directions.

Figure 3:
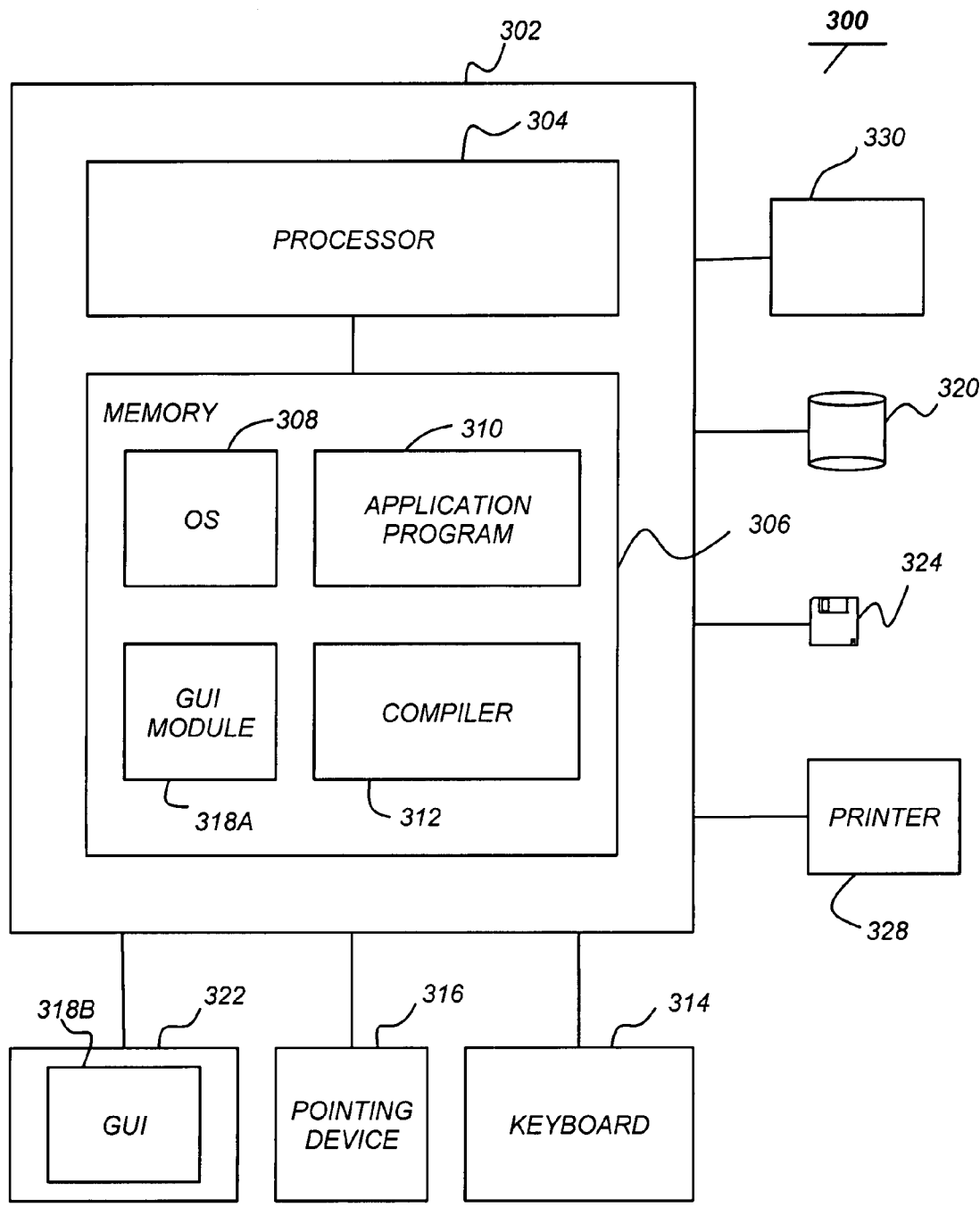
FIG. 3 is a block diagram showing an exemplary hardware environment for practicing an embodiment.

FIG. 3 illustrates an exemplary device, such as a computer system 300 that could be used to implement the apparati and method steps discussed above. The computer 302 comprises a processor 304 and a memory, such as random access memory (RAM) 306. The computer 302 is operatively coupled to a display 122, which presents images such as windows to the user on a graphical user interface 318B. The computer 302 may be coupled to other devices, such as a keyboard 314, a mouse device 316, a printer, etc. Of course, those skilled in the art will recognize that any combination of the above components, or any number of different components, peripherals, and other devices, may be used with the computer 302.

Generally, the computer 302 operates under control of an operating system 308 stored in the memory 306, and interfaces with the user to accept inputs and commands and to present results through a graphical user interface (GUI) module 318A. Although the GUI module 318A is depicted as a separate module, the instructions performing the GUI functions can be resident or distributed in the operating system 308, the computer program 310, or implemented with special purpose memory and processors. The computer 302 also implements a compiler 312 which allows an application program 310 written in a programming language such as COBOL, C++, FORTRAN, or other language to be translated into processor 304 readable code. After completion, the application 310 accesses and manipulates data stored in the memory 306 of the computer 302 using the relationships and logic that was generated using the compiler 312. The computer 302 also optionally comprises an external communication device such as a modem, satellite link, Ethernet card, or other device for communicating with other computers.

In one embodiment, instructions implementing the operating system 308, the computer program 310, and the compiler 312 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 308 and the computer program 310 are comprised of instructions which, when read and executed by the computer 302, causes the computer 302 to perform the steps necessary to implement the methods and apparati herein disclosed. Computer program 310 and/or operating instructions may also be tangibly embodied in memory 306 and/or data communications devices 130, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of transmitting information from a source security domain associated with a first security classification to one of a plurality of destination security domains associated with a second security classification, comprising the steps of:

transmitting a target service request having routing information from the source security domain to a source one-way high assurance guard (HAG) service;

inspecting the target service request in the source one-way HAG service to determine if the target service request violates at least one rule governing communications transmitted from the first security domain;

transmitting the target service request to a destination one-way HAG service in the destination security domain via a one-way HAG according to the routing information if the target service request does not violate the at least one rule and discarding the second target service request if the target service request violates the at least one rule; and providing the target service request to the target service;

wherein the target service request is wrapped in a second message to the source one-way HAG service, inspected by the source one-way HAG service to determine if the wrapped target service request violates the at least one rule, and unwrapped in the destination one-way HAG service.

2. The method of claim 1, wherein the second security classification is higher than the first security classification.

3. The method of claim 1, wherein the target service request is formatted by a requesting client in the source security domain.

4. The method of claim 1, wherein the target service request is wrapped by a requesting client in the source security domain.

5. The method of claim 4, wherein the requesting client invokes the source one-way HAG service.

6. An apparatus for transmitting a target service request to a target service, comprising:

a source security domain, associated with a first security classification, the source security domain including source one-way high assurance guard (HAG) service;

a destination security domain, associated with a second security classification, the destination security domain including a destination one-way HAG service; and a one-way HAG, communicatively coupling the source security domain and the destination security domain via the source one-way HAG and the destination one-way HAG;

wherein the source one-way HAG service accepts a target service request, inspects the target service request to determine if the target service request violates at least one rule governing communications transmitted from the source security domain, transmits the target service request to the destination one-way HAG service via the one-way HAG only if the target service request does not violate the at least one rule and discards the target service request if the target service request violates the at least one rule; and wherein the destination one-way HAG service provides the target service request to the target service; and wherein the target service request is wrapped in a second message to the source one-way HAG, inspected by the source one-way HAG service to determine if the wrapped target service request violates the at least one rule, and unwrapped in the destination one-way HAG service if the wrapped target service request does not violate the at least one rule.

7. The apparatus of claim 6, wherein the second security classification is higher than the first security classification.

8. The apparatus of claim 6, wherein the target service request is formatted by a requesting client in the source entity domain.

9. The apparatus of claim 6, wherein the target service request is wrapped by a requesting client in the source entity domain.

10. The apparatus of claim 9, wherein the requesting client invokes the one-way HAG service.

11. A method of transmitting information between a source security domain associated with a first security classification to one of a plurality of destination security domains associated with a second security classification, comprising the steps of:

transmitting a target service request from a client to a source two-way high assurance guard (HAG) service;

generating a unique token from the target service request, the token associating the target service request with the client;

transmitting the target service request and the token to a destination two-way HAG service via a first source one-way HAG service, a HAG and a first destination one-way HAG service;

executing the target service request to produce response data;

transmitting the response data and the token from the destination two-way HAG service to the source two-way HAG service via a second destination one-way HAG service, a second HAG, and a second source one-way HAG service; and delivering the response data to the client.

12. The method of claim 11, wherein:

the target service request is generated in a thread executing in the first security classification; and the thread is suspended after transmitting the target service request and the token to the destination two-way HAG service and resumed upon receipt of the response data and the token in the source two-way HAG service, using the token.

13. The method of claim 12, wherein the step of transmitting the target service request and the token to the destination two-way HAG service via the first source one-way HAG service, the HAG, and the first destination one-way HAG service comprises the steps of:

transmitting the target service request and the token to a first source one-way HAG service;

suspending execution of the thread;

transmitting the target service request and the token from the first source one-way HAG service to a first destination one-way HAG service in the destination security domain via a HAG communicatively coupling the first security domain and the second security domain; and routing the target service request and the token from the first destination one-way HAG service to a destination two-way HAG service in the destination security domain.

14. The method of claim 12, wherein the step of transmitting the response data and the token from the destination two-way HAG service to the source two-way HAG service via a second destination one-way HAG service and the second source one-way HAG service comprises the steps of:

generating a two-way source HAG service request having the response data and the token;

transmitting the two-way HAG service request to a second destination one-way HAG service;

transmitting the two-way source HAG service request to a second source one-way HAG service via the second HAG;

routing the two-way source HAG service request to the two-way source HAG service to extract the response data and the token; and resuming execution of the thread in the source security domain using the token.

15. The method of claim 14, wherein the step of generating a two-way source HAG service request having the response data and the token comprises the step of wrapping the response data and the token in a two-way source service request.

16. The method of claim 11, wherein the target service request is wrapped by the client and extracted by the source two-way HAG service.

17. An apparatus for transmitting a target service request to a target service and receiving a response therefrom, comprising a source security domain associated with a first security classification, the source security domain including a source two-way high assurance guard (HAG) service communicating with a first source one-way HAG service and a second source one-way HAG service;

a destination security domain associated with a second security classification, the destination security domain comprising a destination two-way HAG service communicating with a first destination one-way HAG service and a second destination one-way HAG service;

a first HAG, communicatively coupling the first source one-way HAG service and the first destination one-way HAG service; and a second HAG, communicatively coupling the second destination one-way HAG service and the second source one-way HAG service;

wherein the source two-way HAG service accepts the target service request from a client, generates a unique token from the target service request, the token associating the target service request with the client, and transmits the target service request and the token to the destination two-way HAG service via the first source one-way HAG service, the HAG and the first destination one-way HAG;

wherein the target service executes the target service request to produce response data; and wherein the destination two-way HAG service receives the response data and transmits the response data and the token from the destination two-way HAG service to the source two-way HAG service via the second destination one-way HAG, the second HAG and the second source one-way HAG service to deliver the response data to the client.

18. The apparatus of claim 17, wherein:

the target service request is generated in a thread executing in the source security domain; and the thread is suspended after transmitting the target service request and the token to the destination two-way HAG service and resumed upon receipt of the response data in the source two-way HAG service using the token.

19. The apparatus of claim 18, wherein the source two-way source HAG service request having the response data and the token is generated by wrapping the response data and the token in a source two-way source service request.

20. The apparatus of claim 19, wherein the target service request is wrapped by the client and extracted by the source two-way HAG service.

* * * * *